United States Patent Office 3,444,217
Patented May 13, 1969

3,444,217
SELECTIVE SOLVOLYSIS OF 11β,17α,21-TRIESTERS OF THE PREGNANE SERIES
Elliot L. Shapiro, Cedar Grove, and Lawrence E. Finckenor, Wayne, N.J., assignors to Schering Corporation, Bloomfield, N.J., a corporation of New Jersey
No Drawing. Continuation-in-part of application Ser. No. 483,810, Aug. 30, 1965. This application May 3, 1968, Ser. No. 726,529
Int. Cl. C07c *169/36;* A61k *17/06*
U.S. Cl. 260—397.45                     10 Claims

ABSTRACT OF THE DISCLOSURE

This invention relates to a method for preparing 17α,21-diesters by effecting a selective solvolysis of an 11β-trihaloacetoxy-17α,21-di-lower-alkanoyloxy tri-ester of the pregnane series. This invention also relates to novel 17α,21-di-esters prepared by said method, having anti-inflammatory activity.

---

This application is a continuation-in-part of the copending application Serial No. 483,810, filed Aug. 30, 1965, now abandoned.

This invention relates to a new process for the preparation of 17α,21-di-esters of 11β,17α,21-triols of the pregnane series. More particularly, this invention relates to a new process for the preparation of such 17α,21-di-esters which comprises the selective solvolysis of a corresponding 11β,17α,21-tri-ester.

It is, of course, well known in the steroid art that many 17α,21-di-esters of 11β,17α,21-triols of the pregnane series display valuable therapeutic activity as anti-inflammatory agents. Included among such compounds are, for example, 17α,21-di-ester derivatives of such important anti-inflammatory steroids as prednisolone and 16α- and 16β-methyl and 9α-halo analogs. Further, and perhaps more importantly, these 17α,21-di-esters can be readily converted into the corresponding 17α-mono-ester many of which, and particularly the 17α-valerate of 9α-fluoro-16β-methylprednisolone, have been found to be extremely potent topical anti-inflammatory agents.

Accordingly, it is the object of this invention to provide a simple and direct method for the preparation of therapeutically active 17α,21-di-esters of 11β,17α,21-triols of the pregnane series in high and uniform yield from readily available starting materials.

Further, it is the object of this invention to provide a simple and direct method for the preparation of 17α,21-di-esters of 11β,17α,21-triols of the pregnane series which may readily be converted by methods well-known in the art to the corresponding 17α-mono-esters.

Prior to applicants' discovery of the process of the instant invention, it was recognized in the prior art that esterification of 11β,17α,21-triols resulted normally in the formation of 21-mono-esters; that under more rigorous conditions, 11β,21-di-esters would be formed; and that under still more rigorous conditions, 11β,17α,21-tri-esters could be prepared. No method has yet been described for selective esterification of both the 17α- and 21-hydroxy groups in the presence of a free hydroxy group at C–11. Further, no method has yet been described whereby selective solvolysis of an ester group at C–11 could be carried out in an 11β,17α,21-tri-acyloxy steroid. Thus applicants' discovery of the selective solvolysis process described hereinafter affords an entirely new approach to the preparation of 17α,21-di-esters, and consequently to the preparation of 17α-mono-esters of 11β,17α,21-triols of the pregnane series and constitutes a valuable contribution to the steroid art.

In its process aspect, therefore, the invention sought to be patented herein may be described as residing in the concept of a method for preparing 17α,21-di-esters of 11β,17α,21-triols of the pregnane series which comprises treating an 11β-trihaloacetoxy-17α,21-di-lower alkanoyloxy tri-ester of the pregnane series with a solution containing an alkali metal or alkaline earth metal salt of an acid having a pKa falling within the range between about 2.3 and about 7.3 whereby the 11β-trihaloacetoxy grouping is selectively solvolyzed to a free hydroxy group.

The instant invention is based upon applicants' discovery that the trihaloacetoxy grouping at C–11 is readily converted to a free hydroxy group when treated at ambient temperatures by the salt promoted solvolysis described above. No significant solvolysis at C–21 or C–17 is observed during the reaction and the desired 17α,21-di-ester is obtained in high yield. Further, ester groupings other than trihaloacetoxy which may be present at other positions of the pregnane nucleus are undisturbed during the reaction.

The starting material for the process of the instant invention, as indicated above, is an 11β-trihaloacetoxy-17α,21-di-lower alkanoyloxy triester of the pregnane series. By the expression, "trihaloacetoxy," as employed herein, is meant trifluoro-, trichloro-, tribromo- and triiodoacetoxy groupings or mixed trihaloacetoxy groupings such as, for example, fluorodichloroacetoxy, dichlorofluoroacetoxy, fluorodibromoacetoxy and the like. Trifluoroacetoxy esters are particularly preferred. The expression, "lower alkanoyloxy," is intended to include both straight and branched chain alkanoyloxy groupings wherein the alkanoyl moiety contains from 1 to 9 carbon atoms. Typical lower alkanoyloxy groupings are, for purpose of illustration merely and without limiting the generality of the foregoing, acetyloxy, propionyloxy, butyryloxy, isobutyryloxy and valeryloxy, heptoyloxy and the like.

By employing the term "pregnane series" applicants intend to make clear that the process of the instant invention is one of general applicability. Indeed any steroid of the pregnane series having an 11β-trihaloacetoxy group and a lower alkanoyloxy grouping at C–17 and at C–21 can be employed as the starting material since functional groups at other positions of the steroid nucleus are entirely undisturbed during the reaction. Frequently, the starting tri-ester will have, in addition to the substituents specified above, a ketonic oxygen or hydroxy function in the 3-position. Also, there may be substituents such as hydroxy, keto, halogen, ether and lower alkyl groupings, at other positions of the steroid nucleus such as at positions 1, 2, 4, 6, 7, 9, 16 and 20. Where free hydroxy are present, they may be converted to ester groupings since, as pointed out above, such groupings are not disturbed during the selective hydrolysis at C–11. The starting tri-ester may be completely saturated or may have one or more double bonds such as, for example, in the 1:2, 3:4, 4:5, and/or 5:6 positions.

Among the more valuable 17α,21-di-esters prepared according to the process of this invention are those derived from starting tri-esters having a double bond in the 4:5 position or in the 1:2 and 4:5 positions; a keto group in the 3-position; a keto group in the 20-position; and a halogen, especially fluorine, at the 6 and/or 9 positions. Particularly desirable are di-esters derived from starting materials which contain, in addition to the above, a methyl group (α or β) at the 16-position or a methyl or acyloxy group (α) at the 6 or 16-positions. Typical di-esters of this group are, for purpose of illustration merely, di-esters of such important anti-inflammatory steroids as prednisolone, 6α-methylprednisolone, beta-methasone, dexamethasone, triamcinolone, 6α-fluorotriamcinolone, flumethasone and paramethasone.

The 11β-trihaloacetoxy-17α,21-di-lower alkanoyloxy tri-ester starting materials as described above may be prepared by methods conventional in the steroid art. Conveniently, for example, the desired tri-esters may be obtained from the corresponding 11β,17α-dihydroxy-21-lower alkanoyloxy mono-ester. Introduction of the trihaloacetoxy grouping at C–11 is readily accomplished by treating the mono-ester in pyridine at about −20° C. with a trihaloacetic anhydride. The 17α-hydroxy-11β-trihaloacetoxy-21-lower alkanoyloxy di-ester so produced is then subjected to further esterification to introduce the lower alkanoyloxy grouping at C–17. This may be readily accomplished by treating the di-ester at an ambient temperature with a lower alkanoic acid and its anhydride in the presence of a strong acid catalyst such as paratoluene-sulfonic acid or by treating the said di-ester with trifluoroacetic anhydride and a lower alkanoic acid at about 80° C. Recovery of the tri-ester so produced provides the starting material for the process of the instant invention. Where starting materials are desired having specific substituents at other positions of the steroid nucleus, it is merely necessary to select the appropriately substituted mono-ester as the starting material in the process described above.

The salt employed as catalyst in the process of the instant invention has been described above as an alkali metal or alkaline earth metal salt of an acid having a pKa falling within the range between about 2.3 and 7.3. The terms, "alkali metal," and "alkaline earth metal," are intended to embrace all those metals falling within Groups Ia and IIa of the Periodic Chart of the Elements including, for example, lithium, sodium, potassium, rubidium, cesium, beryllium, magnesium, calcium, strontium and barium. Salts of any of these metals, and especially sodium and potassium, with acids, either organic or inorganic, having a pKa falling within the specified range are entirely satisfactory for the process of the instant invention.

As is of course apparent from the above, the salts found useful in the process of the instant invention are salts of strong bases and weak acids. It is critical to the successful operation of the invention that the acid moiety of the salt be that of an organic or inorganic acid having a pKa falling within the specified range. Salts of acids having higher or lower pKa values have been found in practice to give either very poor conversion of the 11β-trihaloacetoxy group into the free hydroxy group or to simultaneously hydrolyze the desired ester groupings at positions 17 and 21. Typical of the salts useful in applicants' process are, for example, potassium bicarbonate, disodium phosphate, calcium acetate, sodium azide, magnesium benzoate, sodium formate, lithium nitrite, barium valerate, potassium salicylate, trisodium citrate, potassium glycinate and sodium trifluoroacetate. Applicants have found the sodium and potassium salts of hydrazoic acid, formic acid and trifluoroacetic acid to be especially suitable.

As is apparent to one of ordinary skill in the art, the instant solvolysis may be effected in solvents in which the steroidal triester is soluble. However, it is preferred to effect the solvolysis in those solvents wherein alkali metal or alkaline earth metal salts are also soluble. Exemplary of the preferred solvents are the following: tertiary amides of which dimethylformamide, dimethylacetamide and N-methyl-2-pyrollidone are exemplary; lower alkylsulfoxides such as dimethylsulfoxide; lower alkylsulfones such as dimethylsulfone; di-lower alkylketones such as acetone and methyl ethyl ketone; and lower alcohols such as methanol, ethanol and the like. The lower alcohols are the preferred solvents, especially those having from 1 to 4 carbon atoms; methanol being most preferred.

In general, the selective solvolysis of this invention is carried out by dissolving the starting triester (for example, betamethasone 11β-trifluoroacetate-17α-valerate-21-acetate) in approximately 50 volumes (i.e. 50 cc. of solvent per g. of steroid) of the desired solvent (for example, methanol). To this solution, the salt (for example, sodium azide) is then added. Since the salt functions in the reaction as a promoter in the solvolysis, it may be employed in quite small quantities. Since buffer action is desirable also because the solvolysis of the 11-trifluoroacetate group may not go to completion if the medium should become acidic, applicants have found it convenient in practice to employ large excesses of salt ranging from 1 to 10 times the weight of the steroidal substrate. Following the addition of salt, the reaction mixture is stirred at room temperature until solvolysis is complete which, depending upon the steroid being treated, the solvent selected and salt employed, usually requires from 1–24 hours.

Upon completion of the reaction, the resulting di-ester (betamethasone 17α-valerate 21-acetate in the experiment outlined above) is readily precipitated from the reaction mixture by the addition of water. Water precipitation of the di-ester product is a particularly advantageous isolation technique because it simultaneously dissolves the residual salt thereby permitting a substantially cleaner product to be obtained. The crude di-ester then may be isolated by filtration and purified from a suitable organic solvent or solvent mixture such as, for example, acetone, dioxane, methanol, hexane, acetone-hexane or the like.

The best mode contemplated by applicants for carrying out their invention is more fully illustrated in the following working examples. It is to be understood, however, that these examples are for illustrative purposes merely and that no limitation is implied or intended except as recited in the appended claims.

Example 1.—Preparation of 11β-trihaloacetoxy-17α,21-di-lower alkanoyloxy tri-esters of the pregnane series (a) Esterification of the 21-hydroxy group.—Add 1 g. of betamethasone to a solution of 5 ml. of pyridine and 1 ml. of acetic anhydride. Allow the reaction mixture to remain at room temperature for approximately 18 hours. Dilute the reaction mixture with water and separate the precipitate by filtration. Recrystallize from aqueous methanol to obtain pure betamethasone 21-acetate.

(b) Introduction of the 11-trihaloacetoxy group.—With the temperature maintained at about −20° C., add 5 ml. of trifluoroacetic anhydride to 50 ml. of dry pyridine followed by 5 g. of betamethasone 21-acetate. Agitate for about 30 minutes. Pour the reaction mixture into 500 ml. of iced water containing 44 ml. of concentrated hydrochloric acid. Continue agitation for an additional 30 minutes. Separate the precipitate by filtration washing the precipitate with water until neutral. Dry the precipitate at 50° C. and recrysallize from aqueous methanol to yield betamethasone 11β-trifluoroacetate-21-acetate.

(c) Esterification of the 17α-hydroxy group.—To a mixture of 10 ml. of valeric acid and 4 ml. of trifluoroacetic anhydride, add 1 g. of betamethasone 11β-trifluoroacetate -21-acetate and heat at approximately 80° C. for 1 hour. Pour the reaction mixture into 120 ml. of hot water and heat on a steam bath for about 30 minutes. Cool the reaction mixture and extract into methylene chloride. Wash the extract with water, 10% aqueous potassium carbonate and again with water. Dry the extract with anhydrous magnesium sulfate and concentrate to dryness under vacuum. Place the crude extract on 100 g. of silica gel and elute with increasing percentages of ether in hexane combining like fractions. Evaporate the combined eluate to dryness and recrystallize from acetone-hexane to yield betamethasone 11β-trifluoroacetate-17α-valerate - 21 - acetate.

It will be apparent to anyone skilled in the steroid art that the esterification techniques described in the above example are quite conventional and that they are of general applicability. By employing processes (a), (b) and (c), therefore, and selecting appropriate 11β,17α,21-trihydroxy substrates and acylating acids or anhydrides, any desired 11β-trihaloacetoxy-17α,21-di-lower alkanoyloxy tri-ester of the pregnane series can be prepared.

As an alternative, however, 11β-trihaloacetoxy-17α,21-di-lower alkanoyloxy tri-esters of the pregnane series may be prepared by the following process which is particularly advantageous where it is desired to prepare tri-esters wherein the ester groupings at positions 17 and 21 are derived from the same lower alkanoic acid.

Example 2.—Alternative preparation of 11β-trihaloacetoxy-17α,21-di-lower alkanoyloxy tri-esters of the pregnane series (a) Introduction of the 11-trihaloacetoxy group.—To a mixture of 4 ml. of trifluoroacetic anhydride in 20 ml. of dry pyridine maintained at −20° C., add 2 g. of betamethasone and agitate for 30 minutes. Pour the reaction mixture into 200 ml. of cold water containing 17.6 ml. of concentrated hydrochloric acid. Stir for 1 hour; filter and air dry at 40° C. Dissolve the dried precipitate in 10 percent aqueous methanol. Add 0.1 part by weight of para-toluenesulfonic acid monohydrate and stir at room temperature for 2 hours. Dilute with 80 ml. of water, filter and air dry at 40° C. Purify the crude betamethasone 11β-trifluoroacetate by recrystallizing from acetone-hexane.

Alternatively, the 11-trihaloacetate monoester can be prepared by the acid hydrolysis of the corresponding 11β-trihaloacetoxy-21-lower alkanoyloxy di-ester prepared according to Example 1(a) and (b). Thus one might add 1 g. of betamethasone 11-trifluoroacetate-21-acetate, for example, to a solution of 1.75 ml. of 70 percent aqueous perchloric acid in 68.25 ml. of methanol. Stir the reaction mixture at room temperature for 17 hours and pour into 700 ml. of cold water. Separate the precipitated betamethasone 11β-trifluoroacetate by filtration and air dry at 40° C. Purify by recrystallization from acetone-hexane.

(b) Esterification of the 17- and 21-hydroxy groups.—To a mixture of 15 ml. of propionic anhydride 15 ml. of propionic acid and 1 g. of para-toluenesulfonic acid monohydrate, add 1 g. of betamethasone 11β-trifluoroacetate. Stir at room temperature for 48 hours. Pour the reaction mixture into 500 ml. of water and heat on a steam bath for 4 hours. Cool the reaction mixture and decant the liquids. Dissolve the insolubles in methylene chloride. Wash with 10 percent aqueous sodium bicarbonate, then with water. Dry with anhydrous magnesium sulfate. Concentrate the solution to dryness under vacuum. Purify the residue by elution from a silica gel column using increasing percentages of ether in hexane and combining like fractions. Evaporate the combined eluate to dryness and crystallize the betamethasone 11-trifluoroacetate-17α,21-dipropionate from aqueous methanol.

Example 3.—Solvolysis of betamethasone 11B-trifluoroacetate-17α,-valerate-21-acetate To a solution of 1 g. of betamethasone 11-trifluoroacetate-17α-valerate-21-acetate in 45 ml. of methanol, add 10 g. of sodium azide and stir at room temperature for 1 hour. Pour the reaction mixture into 450 ml. of cold water, filter and air dry at 60° C. Purify the crude betamethasone 17α-valerate-21-acetate by recrystallizing from acetone-hexane.

Example 4.—Solvolysis of betamethasone 11β-trifluoroacetate-17α,21-dipropionate

To a suspension of 10 g. of potassium formate in 40 ml. of ethanol, add 1 g. of betamethasone 11β-trifluoroacetate-17α,21-dipropionate (prepared according to the process of Example 1 or Example 2). Stir at room temperature for 1 hour. Pour the reaction mixture into cold water. Separate the precipitate by filtration and air dry at 60° C. Purify the crude betamethasone 17α,21-dipropionate by recrystallizing from acetone-hexane.

Example 5.—Solvolysis of dexamethasone 11β-trifluoroacetate-17α,21-dibutyrate

Add 1 g. of dexamethasone 11β - trifluoroacetate-17α,21-dibutyrate (prepared according to the process of Example 1 or Example 2) to a suspension of 10 g. of sodium benzoate in 45 ml. of ethanol. Stir at room temperature for 1 hour. Pour the reaction mixture into cold water. Separate the precipitate by filtration and air dry at 60° C. Purify the crude dexamethasone 17α,21-dibutyrate by recrystallizing from aqueous methanol.

Example 6.—Solvolysis of flumethasone 11β-trifluoroacetate-17α-octanoate-21-acetate To a suspension of 10 g. of potassium nitrate in 50 ml. of propanol, add 1 g. of flumethasone 11β-trifluoroacetate-17α-octanoate-21-acetate (prepare daccording to the process of Example 1). Stir at room temperature for 6 hours and pour the reaction mixture into 500 ml. of cold water separating the precipitate by filtration. Dry the crude flumethasone 17α-octanoate-21-acetate on air at 60° C. and purify by recrystallizing from aqueous methanol.

Example 7.—Solvolysis of paramethasone 11β-trifluoroacetate-17α-propionate-21-butyrate Add 1 g. of paramethasone-11β-trifluoroacetate-17α-propionate-21-butyrate (prepared according to the process of Example 1) to a suspension of 10 g. of sodium butyrate in 40 ml. of butanol. Stir at room temperature for 13 hours. Pour the reaction mixture into cold water. Separate the precipitate by filtration and air dry at 60° C. Purify the crude paramethasone 17α-propionate-21-butyrate by recrystallizing from aqueous methanol.

Example 8.—Solvolysis of prednisolone 11β-trichloroacetate-17α,21-dipropionate

To a solution of 1 g. of prednisolone 11β-trichloroacetate 17α,21-dipropionate (prepared according to the process of Example 1 or Example 2) in 45 ml. of methanol, add 10 g. of sodium azide and stir at room temperature for 6 hours. Pour the reaction mixture into 500 ml. of cold water, filter and air dry the precipitate at 60° C. Purify the crude prednisolone 17α,21-dipropionate by recrystallizing from acetone-hexane.

Example 9.—Solvolysis of triamcinolone 11β-trifluoroacetate-16α,21-dipropionate-17α-valerate To a suspension of 10 g. of potassium formate in 40 ml. of methanol, add 1 g. of triamcinolone 11β-trifluoroacetate-16α,21-dipropionate - 17α - valerate (prepared according to the process of Example 1—note that diesterification at positions 16 and 21 occurs in step (a)). Stir at room temperature for 1 hour. Pour the reaction mixture into cold water. Separate the precipitate by by filtration and air dry at 60° C. Purify the crude triamcinolone 16α,21-dipropionate-17α-valerate by recrystallizing from aqueous methanol.

Conversion of the 17α,21-diesters prepared by the solvolysis illustrated in the preceding examples into the corresponding 17α-monoesters may be readily accomplished by the following conventional technique.

Example 10.—Preparation of 17α-monoesters

Add 1 g. of betamethasone 17α-valerate-21-acetate to a solution of 7 ml. of 70% aqueous perchloric acid in 68 ml. of methanol maintained at about 0° C. Stir the reaction mixture for about 48 hours. Pour the reaction mixture into 700 ml. of cold water. Separate the precipitate by filtration; air dry at 40° C. and purifying the crude betamethasone 17α-valerate by recrystallizing from acetone-hexane.

Example 11.—9α-chloro-16α-methyl - $\Delta^{1,4}$ - pregnadiene-11β,17α,21-triol-3,20-dione-17-butyrate 21-acetate To a suspension of 1 g. sodium azide in 4.5 ml. dimethyl-formamide, add 100 mg. 9α-chloro-16α-methyl- $\Delta^{1,4}$-pregnadiene-11$\beta$,17$\alpha$,21-triol-3,20-dione 11-trifluoroacetate-17-butyrate 21-acetate. Stir at room temperature for 66 hours. Precipitate into 45 ml. water, filtrate and air dry. Crystallize from acetone/hexane to yield 9$\alpha$-chloro-16$\alpha$-methyl-$\Delta^{1,4}$-pregnadiene-11$\beta$,17$\alpha$,21-triol-3,20-dione 17-butyrate-21-acetate.

Example 12.—9$\alpha$-chloro-16$\alpha$-methyl-$\Delta^{1,4}$-pregnadiene-11$\beta$,17$\alpha$,21-triol-3,20-dione 17-propionate-21-acetate To a suspension of 1 g. sodium azide in 4.5 ml. dimethylsulfoxide add 100 mg. of 9$\alpha$-chloro-16$\alpha$-methyl-$\Delta^{1,4}$-pregnadiene-11$\beta$,17$\alpha$,21-triol-3,20-dione 11-trifluoroacetate-17-propionate 21-acetate and stir at room temperature. At 40 hours pour into water, filter and air dry. Crystallize from acetone/hexane to yield 9$\alpha$-chloro-16$\alpha$-methyl-$\Delta^{1,4}$-pregnadiene-11$\beta$,17$\alpha$,21-triol-3,20-dione-17-propionate-21-acetate.

Example 13.—Betamethasone-17,21-dipropionate

Stir a mixture of 1 g. 9$\alpha$-fluoro-16$\beta$-methyl-$\Delta^{1,4}$-pregnadiene-11$\beta$,17$\alpha$,21-triol-3,20-dione 11-trifluoroacetate-17,21-dipropionate and 10 g. sodium azide in 45 ml. acetone. At 100 hours the reaction is precipitated into 450 ml. water, filtered and air dried. The crude reaction mixture is placed on a 50 g. silica gel column and eluted with a solvent mixture comprising cyclohexane/ethyl acetate in the ratio by volume of 3:2. The early fractions (starting material) from the column are combined and recycled through the process. The later chromatographically homogeneous fractions are combined, concentrated in vacuo to a residue, and crystallized from acetone-hexane to yield betamethasone-17,21-dipropionate.

Although the starting materials employed in the process of the instant invention having been described above as having lower alkanoyloxy groupings at positions 17 and 21, it will be apparent that esters of other types may be present at one or both of these positions. It will be obvious, for example, that other hydrocarbon carboxylic acid ester groupings such as benzoyloxy, phenylpropionyloxy and cyclohexylcarboxy can also be present at the 17 and/or 21-positions. Also, it will be obvious that salts and other alkali metal and alkaline earth metals could be employed to promote the solvolysis since it is the pKa of the acid from which the salt is derived which is the critical factor. Indeed, it will be apparent that any salt of an acid having the specified pKa, and which is soluble in the reaction medium, can be employed. Applicants consider all such modifications to be the full equivalent of the embodiments specifically disclosed and to fall within the scope of this invention.

Finally, applicants have pointed out above that the 17$\alpha$,21-di-esters which may be prepared by the process of this invention, quite apart from their usefulness as anti-inflammatory agents per se, serve as valuable intermediates for the preparation of the corresponding 17$\alpha$-monoesters many of which are known to be extremely potent topical anti-inflammatories. This conversion is readily accomplished by conventional methods such as by treating the di-ester (betamethasone 17$\alpha$-valerate 21-acetate, for example) in methanolic solution with perchloric acid at a temperature of about 0° C. Such treatment completely hydrolyzes the ester grouping at C-21 and the resulting 17$\alpha$-monoester (betamethasone 17$\alpha$-valerate in the case illustrated) is easily recovered and purified by conventional techniques. The process of the instant invention, therefore, not only offers a new approach to the preparation of 17$\alpha$-21-di-esters of 11$\beta$,17$\alpha$,21-triols of the pregnane series, but makes possible a completely new approach to the preparation of the corresponding 17$\alpha$-mono esters.

We claim:
1. The method of preparing 17$\alpha$,21-diesters of 11$\beta$,17$\alpha$,21-triols of the pregnane series which comprises: treating an 11$\beta$-trihaloacetoxy-17$\alpha$,21-di-lower alkanoyloxy triester of the pregnane series with a solution containing an alkali metal or alkaline earth metal salt of an acid having a pKa falling within the range between about 2.3 and about 7.3 whereby the 11$\beta$-trihaloacetoxy grouping is selectively converted to a free hydroxy group.

2. The method of preparing 17$\alpha$,21-diesters according to claim 1 which comprises treating an 11$\beta$-trihaloacetoxy-17$\alpha$,21-di-lower alkanoyloxy triester of the pregnane series with a lower alkanol solution containing an alkali metal or alkaline earth metal salt of an acid having a pKa falling within the range between about 2.3 and about 7.3 whereby the 11$\beta$-trihaloacetoxy grouping is selectively converted to a free hydroxy group.

3. The process of claim 1 wherein the triester is an 11$\beta$-trifluoroacetate and the salt is a sodium or potassium salt.

4. The process of claim 2 wherein the triester is an 11-$\beta$-trifluoroacetate; the lower alkanol is methanol and the salt is a sodium or potassium salt.

5. The process of claim 4 wherein the triester is betamethasone 11$\beta$-trifluoroacetate-17$\alpha$-valerate-21-acetate.

6. The process of claim 4 wherein the tri-ester is betamethasone 11$\beta$-trifluoroacetate-17,21-dipropionate.

7. The process of claim 4 wherein the tri-ester is dexamethasone 11$\beta$-trifluoroacetate-17$\alpha$,21-dibutyrate.

8. The process of claim 4 wherein the tri-ester is flumethasone 11$\beta$-trifluoroacetate-17$\alpha$-butyrate-21-acetate.

9. The process of claim 4 wherein the tri-ester is paramethasone 11$\beta$-trifluoroacetate-17$\alpha$-propionate-21-butyrate.

10. The process of claim 4 wherein the tri-ester is prednisolone 11$\beta$-trichloroacetate-17$\alpha$,21-dipropionate.

References Cited

UNITED STATES PATENTS

| | | | |
|---|---|---|---|
| 2,800,489 | 7/1957 | Reichstein et al. | 260—397.1 |
| 2,959,602 | 11/1960 | Gould et al. | 260—397.45 |

LEWIS GOTTS, *Primary Examiner.*

ETHEL G. LOVE, *Assistant Examiner.*

U.S. Cl. X.R.

260—999